US012542050B2

(12) United States Patent
Chen et al.

(10) Patent No.: US 12,542,050 B2
(45) Date of Patent: Feb. 3, 2026

(54) TAMPER DETECTION

(71) Applicant: RESIDEO LLC, Golden Valley, MN (US)

(72) Inventors: Doon Chen, Shanghai (CN); Yongjun Chen, Shanghai (CN); Juanchun Peng, Shanghai (CN)

(73) Assignee: RESIDEO LLC, Golden Valley, MN (US)

( * ) Notice: Subject to any disclaimer, the term of this patent is extended or adjusted under 35 U.S.C. 154(b) by 173 days.

(21) Appl. No.: 18/255,691

(22) PCT Filed: Dec. 9, 2020

(86) PCT No.: PCT/CN2020/134953
§ 371 (c)(1),
(2) Date: Jun. 2, 2023

(87) PCT Pub. No.: WO2022/120643
PCT Pub. Date: Jun. 16, 2022

(65) Prior Publication Data

US 2024/0371255 A1 Nov. 7, 2024

(51) Int. Cl.
*G08B 29/04* (2006.01)

(52) U.S. Cl.
CPC .................................. *G08B 29/046* (2013.01)

(58) Field of Classification Search
CPC .................................................... G08B 29/046
USPC ........................................................... 340/506
See application file for complete search history.

(56) References Cited

U.S. PATENT DOCUMENTS 4,621,378 A 11/1986 Hatchman
4,873,936 A 10/1989 Ponticelli
5,764,729 A * 6/1998 Black ..................... G08B 29/08 379/438
6,089,626 A 7/2000 Shoemaker
6,137,414 A 10/2000 Federman
6,377,174 B1 4/2002 Siegwart et al.
(Continued)

FOREIGN PATENT DOCUMENTS

CN 200962248 Y 10/2007
CN 201184122 Y 1/2009
(Continued)

OTHER PUBLICATIONS

Supplementary European Search Report in European Application No. EP20964585.2 mailed Sep. 4, 2024.
(Continued)

*Primary Examiner* — Eric Blount
(74) *Attorney, Agent, or Firm* — Greenberg Traurig, LLP; Nicholas Martin; David J. Dykeman

(57) ABSTRACT

A device includes a housing, a tamper switch supported at the housing, and an actuation arm supported at the housing. The actuation arm includes an actuation column. The actuation arm is movable between a tamper switch engaged position and a tamper switch released position. In the tamper switch engaged position, the actuation column contacts the tamper switch and the actuation arm is at a first angle relative to the tamper switch. In the tamper switch released position, the actuation column is spaced apart from the tamper switch and the actuation arm is at a second angle relative to the tamper switch. The second angle is different than the first angle.

18 Claims, 4 Drawing Sheets

(56) References Cited

U.S. PATENT DOCUMENTS

| | | | |
|---|---|---|---|
| 7,004,784 | B2 | 2/2006 | Castle |
| 7,292,145 | B2 | 11/2007 | Castle et al. |
| 7,388,484 | B2 | 6/2008 | Hsu |
| 7,528,717 | B2 | 5/2009 | Benjelloun et al. |
| 9,269,241 | B2 | 2/2016 | Chiang et al. |
| 9,761,098 | B2 | 9/2017 | Pai et al. |
| 9,953,498 | B2 * | 4/2018 | Van Landingham, Jr. .................. G08B 13/1463 |
| 10,134,251 | B2 * | 11/2018 | Van Landingham, Jr. .................. G08B 13/1472 |
| 10,718,539 | B2 | 7/2020 | Matsuoka et al. |
| 2005/0247085 | A1 | 11/2005 | Porter |
| 2006/0197662 | A1 * | 9/2006 | Castle .................. G08B 29/046 340/568.1 |
| 2007/0040674 | A1 | 2/2007 | Hsu |
| 2007/0236349 | A1 | 10/2007 | Ho Lee |
| 2008/0084292 | A1 | 4/2008 | Dipoala |
| 2009/0167538 | A1 | 7/2009 | Merritt et al. |
| 2009/0320537 | A1 | 12/2009 | Alexander |
| 2010/0295665 | A1 | 11/2010 | Landau et al. |
| 2010/0321186 | A1 | 12/2010 | Crook |
| 2010/0328056 | A1 | 12/2010 | Merkel et al. |
| 2012/0152883 | A1 | 6/2012 | Zhang et al. |
| 2012/0161976 | A1 | 6/2012 | Xie et al. |
| 2012/0188081 | A1 | 7/2012 | Van Katwijk |
| 2012/0319842 | A1 | 12/2012 | Amis |
| 2013/0113397 | A1 | 5/2013 | Salter et al. |
| 2013/0240739 | A1 | 9/2013 | Shpater |
| 2015/0339568 | A1 | 11/2015 | Nekoogar et al. |
| 2016/0196729 | A1 | 7/2016 | Pai et al. |
| 2016/0208520 | A1 | 7/2016 | Jordan et al. |
| 2017/0365142 | A1 | 12/2017 | Pai et al. |

FOREIGN PATENT DOCUMENTS

| | | | |
|---|---|---|---|
| CN | 202406227 | U | 8/2012 |
| CN | 202794529 | U | 3/2013 |
| CN | 203733183 | U | 7/2014 |
| CN | 204406587 | U | 6/2015 |
| CN | 205987103 | U | 2/2017 |
| CN | 207010795 | U | 2/2018 |
| CN | 207337580 | U | 5/2018 |
| CN | 207354462 | U | 5/2018 |
| CN | 208638499 | U | 3/2019 |
| EP | 834847 | B1 | 10/2001 |
| EP | 2096608 | A2 | 9/2009 |
| FR | 2602078 | A1 | 1/1988 |
| GB | 2553289 | A | 3/2018 |
| JP | 2896585 | B2 | 5/1999 |
| JP | 2005316695 | A | 11/2005 |

OTHER PUBLICATIONS

Mark Kretschmar, Lion Precision Sensors, “Capacitive Sensor Operation Part 1: The Basics” , May 1, 2009, 6 pgs.

Mark Kretschmar, Lion Precision Sensors, “Capacitive Sensor Operation Part 2: System Optimization” , Jun. 1, 2009, 5 pgs.

Thomas Perme et al., “Capacitive Touch Using Only an ADC (“CVD”) AN1298” , Microchip Technology Inc., DS01298A, Mar. 26, 2009, 4 pgs.

Atmel Delivers QTouch Capacitive Touch Controller, downloaded from http://sensorsmag.com/electronics-computers/news/atmel-delivers-qtouch-capacitive-touch-control . . . on Nov. 16, 2011, 2 pgs.

Cypress Semiconductor Corporation, “Cypress Perform, PSoC Programmable System-on-Chip” , Document No. 001-67345, Rev. * A, Revised May 13, 2011, 47 pgs.

NXP Semiconductors, “PCA8886—Dual channel capacitive proximity switch with auto-calibration and large voltage operating range”, Rev. 1—Nov. 23, 2011, 26 pgs.

Semtech Launches Smart Proximity Sensor, downloaded from http://sensorsmag.com/electronice-computers/consumer/news/semtech-launches-smart-proximity-sensor-10190?print=1, dated Jun. 25, 2012, 3 pgs.

International Search Report and Written Opinion for International Application No. PCT/CN2020/0134953, mailed Sep. 7, 2021, English Translation, 9 pgs.

Atmel, “QTouch 12-channel Touch Sensor IC, AT42QT2120 [Preliminary]”, 9634AX-AT42, Nov. 2011, 42 pgs.

Atmel, “Proximity Design Guide, Application Note QTAN0087”, 10760A-AT42, Nov. 2011, 12 pgs.

Cypress Semiconductor, “Cypress Perform, CY3235-ProxDet, CapSense Proximity Detection Demonstration Kit Guide”, Doc. #: 001-67986 Rev. * B, Oct. 14, 2011, 34 pgs.

* cited by examiner

TAMPER DETECTION

RELATED APPLICATIONS

This application is a 35 U.S.C. 371 national stage filing from International Application No. PCT/CN2020/134953, filed Dec. 9, 2020, the entire contents of which is incorporated herein by reference.

TECHNICAL FIELD

This disclosure relates generally to tamper detection mechanisms, for instance, that can be included in various devices, systems, and methods. In some embodiments, such tamper detection mechanisms can detect when an associated device is removed from a mounting surface.

BACKGROUND

Security devices can be used to monitor one or more conditions at a premise and, when a predetermined event occurs, alert to the occurrence of that event. An intruder at the premise may attempt to defeat a security function of a security device by attempting to remove the security device from its mounting surface. The intent of the intruder in attempting to remove the security device could be to terminate a power supply and/or a communication link at the security device and, thereby, render the security function of that device ineffective.

SUMMARY

To enhance the security of a device (e.g., a security device), it can be useful to detect an attempt to tamper with the security device. This disclosure in general describes tamper detection mechanism embodiments that can be included in various devices and systems as well as in related methods. In particular, embodiments disclosed herein can facilitate a tamper detection functionality, such as detecting removal of a housing from a mounting surface, in a more effective and cost-efficient manner.

For example, tamper detection mechanism embodiments disclosed herein can eliminate the need for one or more components while, at the same time, increasing the effectiveness of the tamper detection function and simplifying the installation of an associated housing. For instance, tamper detection mechanism embodiments disclosed herein can detect removal of a housing from a mounting surface without needing a fastener to affix the tamper mechanism to the mounting surface independent of the housing. Namely, an actuation arm of tamper detection mechanism embodiments disclosed herein can be configured such that the actuation arm is supported at the housing at each of a tamper switch engaged position and a tamper switch released position. In this way, tamper detection mechanism embodiments disclosed herein can detect removal of the housing from the mounting surface without needing the actuation arm to be directly coupled to the mounting surface.

This can differ from prior tamper mechanisms where a direct coupling of such prior tamper mechanisms to the mounting surface via a fastener (e.g., screw) is required in order for such prior tamper mechanisms to detect removal of the housing from the mounting surface. Thus, the tamper mechanism embodiments disclosed herein can eliminate the need for a fastener (e.g., screw) to couple the tamper mechanism embodiments (e.g., the actuation arm) to the mounting surface in order to detect removal of the housing from the mounting surface. This can result in increased cost-efficiencies associated with the tamper mechanism since the need for such a fastener can be eliminated, in turn, simplifying the installation process associated with the housing. At the same time, this can also result in increased reliability of the tamper mechanism embodiments disclosed herein by eliminating a risk that an installer of the housing inadvertently omits a fastener at the tamper mechanism when mounting the housing at the mounting surface. This can be because the tamper mechanism embodiments disclosed herein can operate to detect removal of the housing without requiring the independent fastening of the actuation arm, or other component of the tamper mechanism, at the mounting surface.

One embodiment includes a device. This device embodiment includes a housing, a tamper switch supported at the housing, and an actuation arm supported at the housing. The actuation arm includes an actuation column. The actuation arm is movable between a tamper switch engaged position and a tamper switch released position. In the tamper switch engaged position, the actuation column contacts the tamper switch and the actuation arm is at a first angle relative to the tamper switch. In the tamper switch released position, the actuation column is spaced apart from the tamper switch and the actuation arm is at a second angle relative to the tamper switch. The second angle is different than the first angle.

In a further embodiment of the device, in the tamper switch engaged position, the actuation column is at the first angle relative to the tamper switch, and, in the tamper switch released position, the actuation column is at the second angle relative to the tamper switch.

In a further embodiment of the device, when the actuation arm is at the first angle, the actuation arm extends along an arm longitudinal axis that is parallel to the tamper switch.

In a further embodiment of the device, when the actuation arm is at the second angle, the actuation arm positions the actuation column further from the tamper switch than when the actuation arm is at the first angle.

In a further embodiment of the device, the actuation arm includes a recessed portion. For example, the recessed portion can be spaced apart along the actuation arm from the actuation column. In this example, the recessed portion can be adjacent to a location where the actuation arm is supported at the housing. Also in this example, the actuation arm can have a first surface facing the tamper switch and a second surface opposite the first surface, and the recessed portion can be at the second surface.

In a further embodiment of the device, the device can additionally include a controller supported at the housing. The controller can be coupled to the tamper switch. When the actuation arm moves from the tamper switch engaged position to the tamper switch released position, the tamper switch can send a tamper signal to the controller. The controller, for example, can be configured to generate a tamper alarm when the controller receives the tamer signal from the tamper switch.

In a further embodiment of the device, the actuation arm can be configured such that the actuation arm is supported at the housing at each of the tamper switch engaged position and the tamper switch released position.

Another embodiment includes a method. This method embodiment includes the step of mounting a housing at a mounting surface. The housing supports a tamper switch and an actuation arm. The actuation arm includes an actuation column. This method embodiment also includes the step of, when mounting the housing at the mounting surface, changing an angle of the actuation arm relative to the tamper switch to move the actuation arm from a tamper switch released position to a tamper switch engaged position. In the tamper switch engaged position, the actuation column contacts the tamper switch and the actuation arm is at a first angle relative to the tamper switch. In the tamper switch released position, the actuation column is spaced apart from the tamper switch and the actuation arm is at a second angle relative to the tamper switch. The second angle is different than the first angle.

In a further embodiment of this method, changing the angle of the actuation arm further includes changing an angle of the actuation column relative to the tamper switch. In the tamper switch engaged position, the actuation arm is at the first angle relative to the tamper switch. In the tamper switch released position, the actuation arm is at the second angle relative to the tamper switch.

In a further embodiment of this method, when the actuation arm is at the first angle, the actuation arm extends along an arm longitudinal axis that is parallel to the tamper switch.

In a further embodiment of this method, when the actuation arm is at the second angle, the actuation arm positions the actuation column further from the tamper switch than when the actuation arm is at the first angle.

In a further embodiment of this method, the actuation arm includes a recessed portion. The recessed portion can be spaced apart along the actuation arm from the actuation column. For example, the recessed portion can be adjacent to a location where the actuation arm is supported at the housing. The actuation arm can have a first surface facing the tamper switch and a second surface opposite the first surface. The recessed portion can be at the second surface. For example, the angle of the actuation arm can be changed by pivoting the actuation arm relative to the housing, and the actuation arm can pivot about a point adjacent the recessed portion.

In a further embodiment of this method, the actuation arm is supported at the housing at each of the tamper switch engaged position and the tamper switch released position.

The details of one or more examples are set forth in the accompanying drawings and the description below. Other features, objects, and advantages will be apparent from the description and drawings, and from the claims.

BRIEF DESCRIPTION OF DRAWINGS

The following drawings are illustrative of particular examples of the present invention and therefore do not limit the scope of the invention. The drawings are not necessarily to scale, though embodiments can include the scale illustrated, and are intended for use in conjunction with the explanations in the following detailed description wherein like reference characters denote like elements. Examples of the present invention will hereinafter be described in conjunction with the appended drawings.

In FIG. 2, an actuation arm of the tamper detection mechanism is shown at an exemplary tamper switch released position.

DETAILED DESCRIPTION

The following detailed description is exemplary in nature and is not intended to limit the scope, applicability, or configuration of the invention in any way. Rather, the following description provides some practical illustrations for implementing examples of the present invention. Those skilled in the art will recognize that many of the noted examples have a variety of suitable alternatives.

Figure 1:
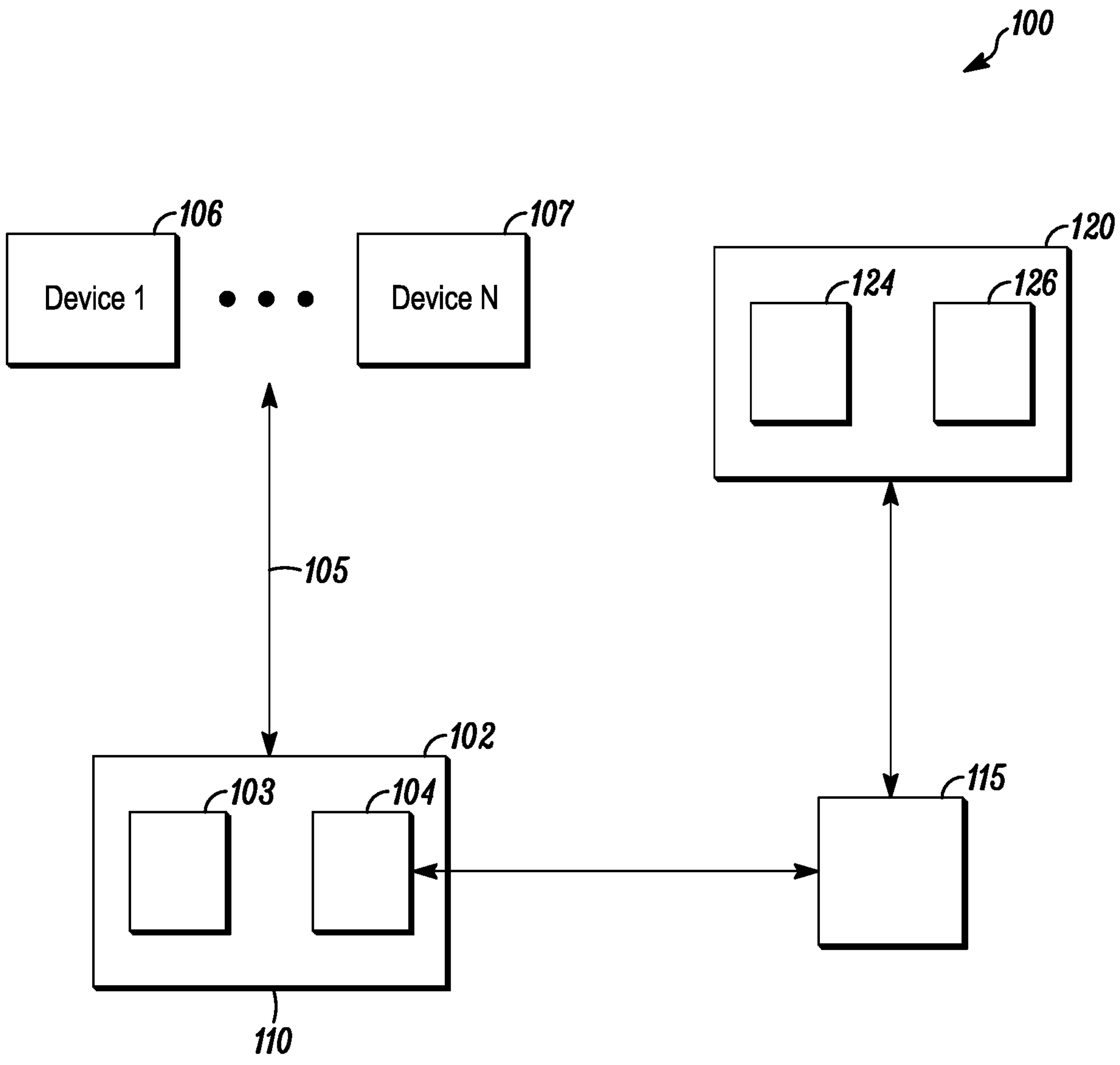
FIG. 1 is a diagram of an embodiment of a system that includes a tamper detection mechanism.

FIG. 1 illustrates one embodiment of a system 100 including a tamper detection mechanism. In the illustrated embodiment, the system 100 includes a control panel 102. The control panel 102 can be in communication with one or more devices 106, 107 in the system 100. Device 106 is shown as "device 1" and device 107 is shown as "device N" to illustrate that the control panel 102 can be in communication with any number of devices from one to N.

For example, each of the control panel 102 and the one or more devices 106, 107 can be located at a premise. The one or more devices 106, 107 can be configured to capture data, detect one or more predetermined conditions, and/or take a specified action at the premise. A communication link 105 between the control panel 102 and each of the one or more devices 106, 107 can facilitate signal communication between the control panel 102 and one or more of the devices 106, 107. The communication link 105 between the control panel 102 and each of the one or more devices 106, 107 can be a wireless communication link or wired communication link. Depending on the type of device 106, 107, the communication link 105 can be one-way from the control panel 102 to one or more devices 106, 107, one-way from one or more devices 106, 107 to the control panel 102, or two-way between the control panel 102 and one or more devices 106, 107. To facilitate signal communication over the communication link 105, each of the one or more devices 106, 107 can include a transmitter and/or receiver (e.g., a wireless transceiver) and the control panel 102 can include a transmitter and/or receiver (e.g., a wireless transceiver). As one example, the one or more devices 106, 107 can be one or more types of security devices, such as a door sensor, window sensor, glass break sensor, keypad, camera, motion detector, and/or smoke or fire detector, and/or one or more types of home automation devices, such as a thermostat, light switch, fan, appliance, and/or blind controller.

The control panel 102 can include a housing 110. Within the housing 110 can be a non-transitory computer-readable storage article 103 and a controller 104. The controller 104 can be in communication with the non-transitory computer-readable storage article 103. In some embodiments, the non-transitory computer-readable storage article 103 is a memory such as flash memory, optical memory, magnetic memory, and read only memory (ROM). In some embodiments, the controller 104 can include a circuit board and/or one or more processors which, for instance, can include integrated circuits (e.g. FPGA, ASIC, microprocessor). In some embodiments, the controller 104 is part of a computing device. The non-transitory computer-readable storage article 103 can include computer-executable instructions which can be executed by the controller 104 (e.g., the one or more processors) to carry out the instructions. For example, the non-transitory computer-readable storage article 103 can store a computer program which the controller 104 of the control panel 102 can execute. Executing the computer-executable instructions can cause the controller 104 to perform various actions as suited for the application of the system 100.

The control panel 102 can be signal communication with a remote server 115. In the illustrated embodiment, the remote server 115 is further in signal communication with a remote user device 120. The remote user device 120 can include a second non-transitory computer-readable storage article 124 and one or more processors 126. In some embodiments, the devices 106, 107 and the control panel 102 can each be located at a common premise, while the remote server 120 can be at a location remote from, and different than, the premise. The remote user device 120 can, for example, be carried with a user such that remote user device 120 can be at the premise when the user is present at the premise and away from the premise when the user is away from the premise. The remote user device 120 can be, for instance, a mobile computing device, such as a smart phone or tablet, that executes a locally stored application and/or receives data wirelessly over a communication network to communicate with the control panel 102 via the remote server 115. In this way, the remote user device 120 can receive signals from the control panel 102 and can transmit signals to the control panel 102 (e.g., a command signal for the control panel 102 and/or one or more device 106, 107 to take a specified action). For example, the control panel 102 can send a tamper notification to the remote server 115 which can then send a corresponding tamper notification to the remote user device 120.

To enhance the security of the system 100, it can be useful to detect when there is an attempt to tamper with one or more items at the premise, such as the control panel 102 and/or the one or more devices 106, 107. For example, an intruder at the premise may attempt to defeat a security function of the system 100 by attempting to remove the control panel 102 and/or the one or more devices 106, 107 from a respective mounting surface. The intent in removing the panel and/or device(s) could be to terminate a power supply and/or a communication link at the panel and/or device(s). Accordingly, the ability to detect an attempt to tamper with one or more items at the premise can facilitate one or more actions within the system to try and thwart the tamper attempt or otherwise notify an appropriate contact as to the tamper attempt.

Figure 2:
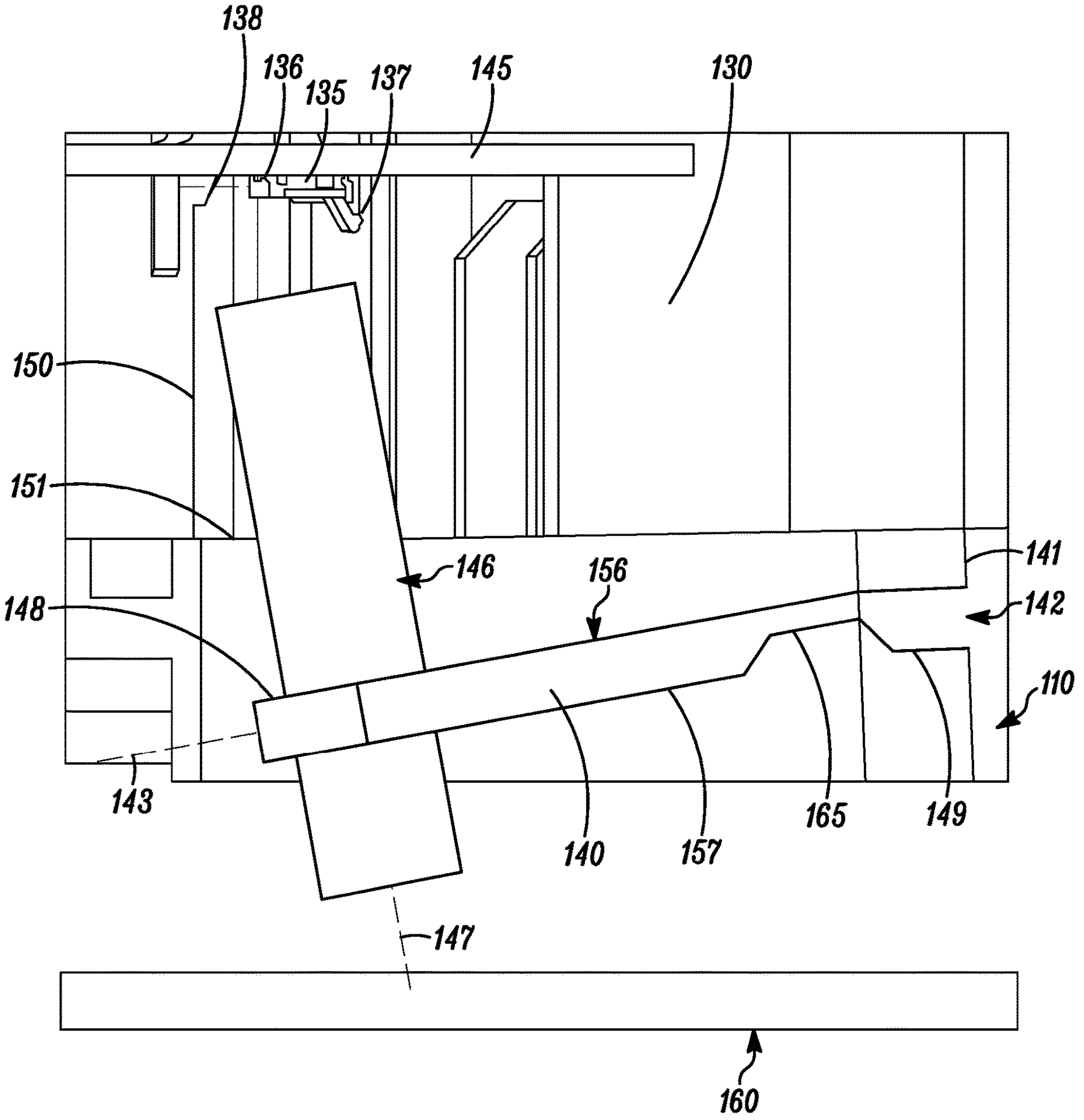
FIG. 2 is an elevational view of an embodiment of a tamper detection mechanism.
Figure 3:
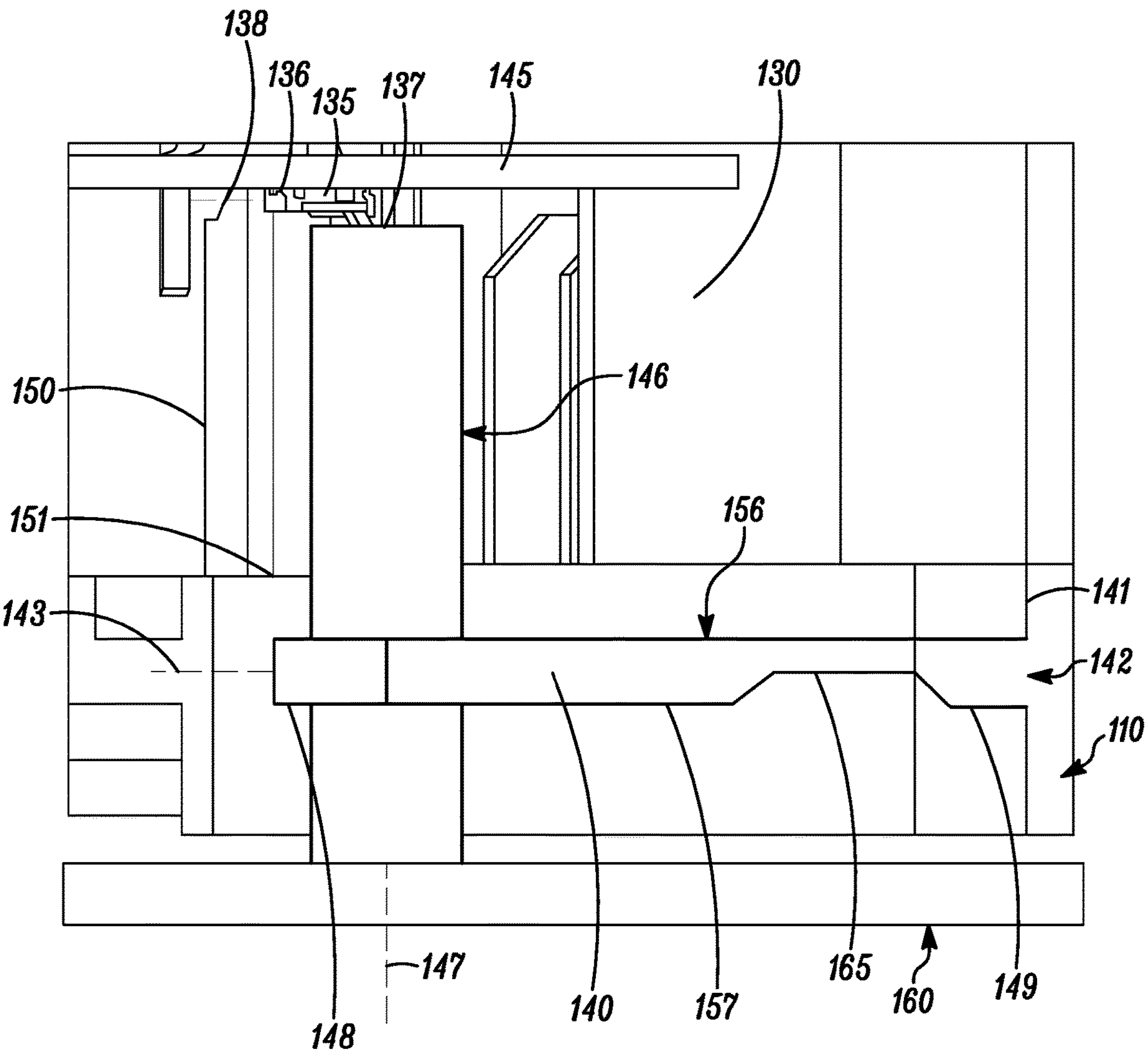
FIG. 3 is an elevational view of the tamper detection mechanism of FIG. 2 but with the actuation arm shown at an exemplary tamper switch engaged position.

FIGS. 2 and 3 illustrate one exemplary embodiment of a tamper detection mechanism 130. Specifically, FIG. 2 is an elevational view of the tamper detection mechanism 130 with an actuation arm 135 shown at an exemplary tamper switch released position. And, FIG. 3 is an elevational view of the tamper detection mechanism 130 with the actuation arm 135 shown at an exemplary tamper switch engaged position.

The tamper detection mechanism 130 can be included at any one or more of the items in the system of FIG. 1, such as the control panel and/or one or more of the devices at the premise. In particular, in the example shown in FIGS. 2 and 3, the tamper detection mechanism 130 is included at the housing 110 of the control panel 102 of the system 100. Though in other examples within the scope of the present disclosure the tamper detection mechanism 130 can be included at the housing of any one or more of the devices 106, 107 (e.g., keypad) of the system 100.

The tamper detection mechanism 130 includes a tamper switch 135 and an actuation arm 140. Each of the tamper switch 135 and the actuation arm 140 is supported at the housing 110. As shown here, the tamper switch 135 and the actuation arm 140 can be supported at the housing 110 at different locations such that the tamper switch 135 is spaced apart from the actuation arm 140. For example, the housing 110 can define a guide channel 150, and the tamper switch 135 can be spaced apart from the actuation arm 140 by the guide channel 150 such that the tamper switch 135 and the actuation arm 140 are generally supported at the housing 110 at opposite ends of the guide channel 150. In particular, in the illustrated embodiment, the actuation arm 140 can be supported at the housing 110 at a location 142. The location 142 at which the actuation arm 140 is supported at the housing 110 can be outside of, and spaced from, an end 151 of the guide channel 150. Namely, as shown here, the location 142 where the actuation arm 140 is supported at the housing 110 is at a side wall 141 of the housing 110 at a location on the side wall 141 where the side wall 141 extends out past the end 151 of the guide channel 150. The actuation arm 140 is shown here as supported at the housing 110 at the location 142 in a cantilevered arrangement such that the actuation arm 140 extends out freely from the side wall 141.

For example, in addition to the tamper switch 135 and the actuation arm 140, the housing 110 can also include a controller 145. The controller 145 can be, for example, a circuit board or processor that is configured to receive a signal from the tamper switch 135 and, in some cases, cause one or more actions as a result of receiving the signal from the tamper switch 135. The controller 145 can also be supported at the housing 110, and the controller 145 can be coupled to the tamper switch 135. In the illustrated embodiment, the tamper switch 135 is supported at the housing 110 via the controller 145. When the tamper switch 135 is actuated, the tamper switch 135 can communicate a signal to the controller 145, as will be described in more detail below.

In the illustrated embodiment, the tamper switch 135 includes a switch housing 136 and a switch actuator 137. The switch housing 136 can be supported, and fixed in place at, the housing 110 (e.g., at the controller 145). The switch actuator 137 can be movable relative to the switch housing 136. Movement of the switch actuator 137, such as from an extended position, for example shown in FIG. 2, to a retracted position, for example shown in FIG. 3, can act to actuate the tamper switch 135. For instance, as shown here, the switch actuator 137 can extend out from the switch housing 136 into the guide channel 150 when the switch actuator 137 is in the extended position and the switch actuator can be retracted back toward the switch housing 136 when the switch actuator 137 is moved toward the retracted position.

To facilitate actuation of the tamper switch 135, the actuation arm 140 can include an actuation column 146. The actuation column 146 can be coupled to the actuation arm 140, for instance, at a location spaced apart along the actuation arm 140 from the location 142 at which the actuation arm 140 is supported at the housing 110 (e.g., at the side wall 141). The actuation column 146 can extend out from the actuation arm 140 in a direction toward the tamper switch 135. For instance, as shown here, the actuation column 146 can extend out from the actuation arm 140 into the guide channel 150 while the actuation arm 140 is outside of the guide channel 150.

To actuate the tamper switch 135, the actuation arm 140 is movable between a tamper switch released position, such as the example position shown in FIG. 2, and a tamper switch engaged position, such as the example position shown in FIG. 3. For example, when mounting the housing 110 to a mounting surface 160, the mounting surface 160 can act to move the actuation arm 140 from the tamper switch released position to the tamper switch engaged position. And, when removing the housing 110 from the mounting surface 160, the actuation arm 140 can move from the tamper switch engaged position to the tamper switch released position. For example, the actuation arm 140 can be biased to the tamper switch released position. As such, in the absence of contact with the mounting surface 160 the actuation arm 140 will revert to the tamper switch released position. Force applied by the mounting surface 160 (e.g., via contact between the mounting surface 160 and the actuation column 146 and/or the actuation arm 140) can overcome the bias on the actuation arm 140 and move the actuation arm 140 to the tamper switch engaged position.

As shown in the example of FIG. 2, in the tamper switch released position the actuation column 146 is spaced apart from the tamper switch 135. As a result, the switch actuator 137 can be in the extended position. In the tamper switch released position, the actuation arm 140 is at one angle relative to the tamper switch 135. And, in embodiments where the actuation column 146 is coupled to the actuation arm 140 in a normal (e.g., perpendicular) orientation, such as illustrated, in the tamper switch released position the actuation column 146 can be at the same angle relative to the tamper switch 135 as the actuation arm 140. For example, the actuation arm 140 can extend along an actuation arm longitudinal axis 143 and the tamper switch 135 can extend along a tamper switch longitudinal axis 138. The tamper switch longitudinal axis 138 can, for example, extend perpendicular to the guide channel 150. In the tamper switch released position, the actuation arm 140 can be at one angle non-parallel relative to the tamper switch 135. As an example, in the tamper switch released position, an angle between the actuation arm longitudinal axis 143 and the tamper switch longitudinal axis 138 can be between zero and ninety degrees, ten and eighty degrees, fifteen and seventy five degrees, twenty and seventy degrees, thirty and sixty degrees, thirty five and fifty five degrees, or forty and fifty degrees. In the exemplary tamper switch released position shown in FIG. 2, the actuation arm 140 is at an angle relative to the tamper switch 135 such that an angle between the actuation arm longitudinal axis 143 and the tamper switch longitudinal axis 138 is between approximately thirty and sixty degrees. Likewise, the in tamper switch released position, an actuation column longitudinal axis 147 of the actuation column 146 can be, for instance, at a non-perpendicular angle (e.g., an angle between zero and ninety degrees) relative to the tamper switch longitudinal axis 138.

As shown in the example of FIG. 3, in the tamper switch engaged position the actuation column 146 contacts the tamper switch 135. As a result, the actuation column 146 can act to move the switch actuator 137 to the retracted position. In the tamper switch engaged position, the actuation arm 140 is at another angle relative to the tamper switch 135 different than the angle between the actuation arm 140 and the tamper switch 135 when in the tamper switch released position. And, in embodiments where the actuation column 146 is coupled to the actuation arm 140 in a normal (e.g., perpendicular) orientation, such as that illustrated, in the tamper switch engaged position the actuation column 146 can be at the same angle relative to the tamper switch 135 as the actuation arm 140. For example, in the tamper switch engaged position, the actuation arm 140 can be at an angle relative to the tamper switch 135 such that the actuation arm 140 extends parallel to the tamper switch 135. In particular, in the tamper switch engaged position, the actuation arm longitudinal axis 143 can be parallel to the tamper switch longitudinal axis 138. And, in the illustrated example, when the actuation arm 140 is parallel to the tamper switch 135, the actuation column 146 can be perpendicular to the tamper switch 135. In particular, in the tamper switch engaged position, the actuation column longitudinal axis 147 can be, for instance, perpendicular to the tamper switch longitudinal axis 138.

As can be seen in comparing the tamper switch released position of FIG. 2 with the tamper switch engaged position of FIG. 3, when the actuation arm 140 is at the angle of the tamper switch released position, the actuation arm positions the actuation column 146 further from the tamper switch 135 than when the actuation arm 140 is at the different angle of the tamper switch engaged position. More specifically, the actuation arm 140 can be brought closer to the guide channel 150 when the actuation arm 140 is in the tamper switch engaged position than when the actuation arm 140 is in the tamper switch released position. This, in turn, acts to bring the actuation column 146 closer to the tamper switch 135 so as to cause the switch actuator 137 to move and actuate the tamper switch 135.

As stated previously, the actuation arm 140 can be moved between the tamper switch engaged position and the tamper switch released position by the mounting surface 160. Namely, as the housing 110 is mounted at the mounting surface 160, the actuation arm 140 is moved from the tamper switch released position to the tamper switch engaged position. This results in moving the switch actuator 137 from the extended position to the retracted position. The force applied by the mounting surface 160 (e.g., via contact with the actuation column 146 or actuation arm 140) can act to maintain the actuation arm 140 in the tamper switch engaged position. However, when the housing 110 is removed from the mounting surface 160, the actuation arm 140 can move from the tamper switch engaged position to the tamper switch released position. When the actuation arm 140 moves from the tamper switch engaged position to the tamper switch released position, the tamper switch 135 can send a tamper signal to the controller 145. As example, movement of the actuation arm 140 from the tamper switch engaged position to the tamper switch released position can cause the switch actuator 137 to move from the retracted position to the extended position, which, in turn, can cause the tamper switch 135 to generate and send the tamper signal to the controller 145.

The controller 145 can be configured to generate a tamper alarm when the controller 145 receives the tamper signal from the tamper switch 135. For example, the tamper alarm can include the controller 145 outputting a tamper alarm signal to another device. For instance, when the tamper mechanism 130 in included at the control panel. The controller 145 at the control panel can output a tamper alarm signal to the remote server and/or one or more of the devices in the system which can cause the remote server and/or one or more of the devices that receive the tamper alarm signal to take a predetermined tamper-related action (e.g., send a tamper notification to the remote user device and/or a central station).

As stated previously, to help facilitate movement of the actuation arm 140 from the tamper switch engaged position to the tamper switch released position (e.g., upon removal of the housing 110 from the mounting surface 160), the actuation arm 140 can be biased to the tamper switch released position.

As one example, to create this bias of the actuation arm 140 to the tamper switch released position, the actuation arm 140 can include a recessed portion 165. The recessed portion 165 can be located at the actuation arm 140 such that the recessed portion 165 is spaced apart, along the actuation arm 140, from the actuation column 146. For instance, the actuation column 146 can be at a first end portion 148 of the actuation arm 140 and the recessed portion 165 can be at a second, opposite end portion 149 of the actuation arm 140. As such, in this arrangement, the recessed portion 165 can be adjacent to the location 142 where the actuation arm 140 is supported at the housing 110 (e.g., adjacent to the side wall 141 of the housing 110). As shown in the illustrated embodiment, the actuation arm 140 can have a first surface 156 facing the tamper switch 135 and a second surface 157 that is opposite the first surface 156, and the recessed portion 165 can be at the second surface 157. As such, the recessed portion 165 can extend into the actuation arm 140 at the second surface 157 creating a lower elevation portion at the second surface 157. The inclusion of the recessed portion 165 can impart a degree of flexibility to the actuation arm 140 thereby allowing the actuation arm 140 to be movable between its biased tamper switch released position to the tamper switch engaged position.

In other embodiments, the actuation arm 140 can be biased to the tamper switch released position by a biasing member component (e.g., a spring) in addition to, or as an alternative to, the recessed portion 165 to help facilitate movement of the actuation arm 140 from the tamper switch engaged position to the tamper switch released position.

The force applied at the housing by the mounting surface 160 (e.g., via contact between the mounting surface 160 and the actuation column 146 and/or the actuation arm 140) can overcome the bias of the actuation arm 140 to the tamper switch released position and move the actuation arm 140 to the tamper switch engaged position. Thus, the bias force on the actuation arm 140 to the tamper switch released position can be less than the force applied by the mounting surface 160 upon contact between the mounting surface 160 and the actuation arm 140 or the actuation column 146.

In the illustrated embodiment, the actuation arm 140 is moved between the tamper switch released position and the tamper switch engaged position by pivoting the actuation arm 140 relative to the housing 110. Accordingly, the pivoting of the actuation arm 140 relative to the housing 110 can result in changing the angle between the actuation arm 140 and the tamper switch 135. For example, the actuation arm 140 can pivot about a point adjacent the recessed portion 165. More particularly, the actuation arm 140 can pivot about the location 142 at which the actuation arm 140 is supported at the housing 110, such as at the side wall 141. Thus, in this way, the cantilevered portion, such as the first end portion 148, of the actuation arm 140 can move relative to the housing 110 (e.g., and relative to the guide channel 150) while the housing supported portion, such as the second end portion 149, of the actuation arm 140 can remain fixed relative to the housing 110 (e.g., and relative to the guide channel 150).

Notably, the actuation arm 140 is configured such that the actuation arm 140 is supported at the housing 110 (e.g., at the location 142 at the side wall 141) at each of the tamper switch engaged position and the tamper switch released position. In this way, in the illustrated embodiment, the tamper mechanism 130 can detect removal of the housing 110 from the mounting surface without needing the actuation arm 140 to be directly coupled to the mounting surface 160. This differs from prior tamper mechanisms where a direct coupling of such prior tamper mechanisms to the mounting surface via a fastener (e.g., screw) is required in order for such prior tamper mechanisms to detect removal of the housing from the mounting surface. Thus, the tamper mechanism 130 can eliminate the need for a fastener (e.g., screw) to couple the tamper mechanism 130 (e.g., the actuation arm 140) to the mounting surface in order to detect removal of the housing 110 from the mounting surface 160. This can result in increased cost-efficiencies associated with the tamper mechanism 130. At the same time, this can also result in increased reliability of the tamper mechanism by eliminating a risk that an installer of the housing inadvertently omits a fastener at the tamper mechanism when mounting the housing at the mounting surface. Namely, the tamper mechanism 130 disclosed herein can operate to detect removal of the housing 110 without requiring the independent fastening of the actuation arm 140, or other component of the tamper mechanism 130, at the mounting surface 160.

Figure 4:
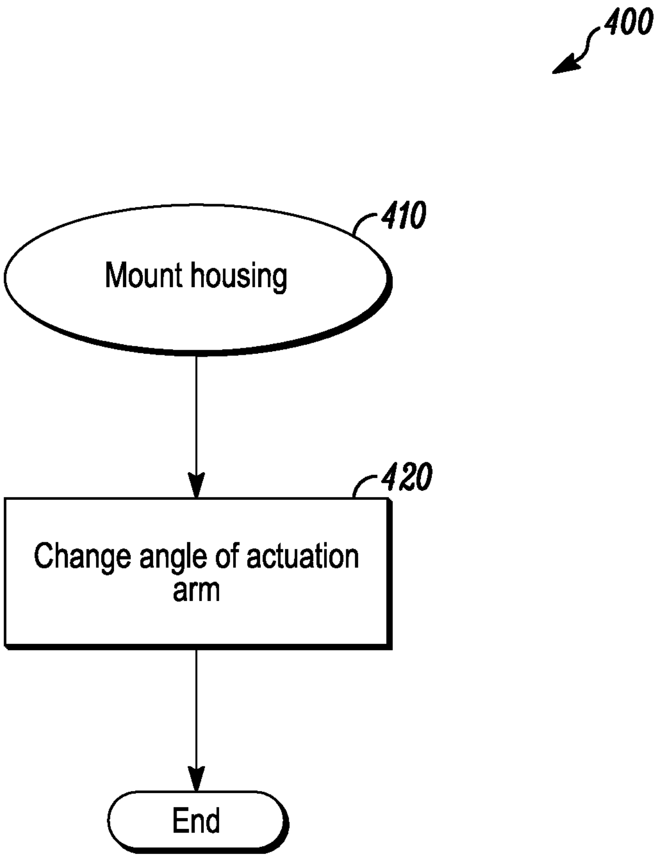
FIG. 4 is a flow diagram of a method of mounting a housing that includes a tamper detection mechanism.

FIG. 4 is a flow diagram of an embodiment of a method 400 of mounting a housing that includes a tamper detection mechanism. The tamper detection mechanism referenced in the method 400 can be the same as, or similar to, embodiments of the tamper mechanism referenced with respect to FIGS. 2 and 3.

At step 410, the method 400 includes mounting a housing at a mounting surface. The housing can be the same as, or similar to, the housing embodiments described elsewhere herein in conjunction with the tamper mechanism. In particular, the housing can support the tamper mechanism and the actuation arm, to which the actuation column can be coupled (and, in some embodiments, the housing can also support the controller). Step 410 can include moving the housing toward a mounting surface so as to bring the mounting surface into contact with the tamper mechanism. More specifically, this can include moving the housing toward a mounting surface so as to bring the mounting surface into contact with one or both of the actuation arm and the actuation column. Notably, the step 410 can include mounting the housing at the mounting surface without coupling any fastener to the actuation mechanism (e.g., without coupling any fastener to either of the actuation arm or the actuation column). Instead, the housing itself can simply be fastened, via one or more fasteners, to the mounting surface without any independent fastening of the tamper mechanism to the mounting surface. Prior to mounting the housing at the mounting surface (e.g., prior to the mounting surface contacting the actuation arm or actuation column) the actuation arm of the tamper mechanism can be at the tamper switch released position, for instance as a result of the bias force on the actuation arm to the tamper switch released position.

At step 420, the method 400 includes changing an angle of the actuation arm when mounting the housing at the mounting surface. The angle of the actuation arm can be changed, relative to the tamper switch, to move the actuation arm from the tamper switch released position to the tamper switch engaged position. The actuation arm can be at one angle, relative to the tamper switch, when at the tamper switch released position, and the actuation arm can be moved to the tamper switch engaged position by changing the angle of the actuation arm, relative to the tamper switch, to an angle different than that when the actuation arm is at the tamper switch released position. Likewise, the actuation column, can be at one angle, relative to the tamper switch, when the actuation arm is at the tamper switch released position, and, when the actuation arm is moved to the tamper switch engaged position, the angle of the actuation column, relative to the tamper switch, can be changed to an angle different than that of the actuation column when the actuation arm is at the tamper switch released position. When the actuation arm is at the tamper switch released position, the actuation column can be spaced apart from the tamper switch, and moving the actuation arm to the tamper switch engaged position can cause the actuation column to contact the tamper switch. As described previously, pivoting a portion of the actuation arm relative to the housing can act to change the angle between the actuation arm and the tamper switch.

Various examples have been described. These and other examples are within the scope of the following claims.

What is claimed is:

1. A device comprising:

a housing;

a tamper switch supported at the housing; and an actuation arm supported at the housing, the actuation arm including an actuation column, the actuation arm being movable between a tamper switch engaged position and a tamper switch released position, wherein:

in the tamper switch engaged position, the actuation column contacts the tamper switch, and the actuation arm and the actuation column are at a first angle relative to the tamper switch, and in the tamper switch released position, the actuation column is spaced apart from the tamper switch, and the actuation arm and actuation column are at a second angle relative to the tamper switch, the second angle being different than the first angle.

2. The device of claim 1, wherein when the actuation arm is at the first angle the actuation arm extends along an arm longitudinal axis that is parallel to the tamper switch.

3. The device of claim 1, wherein when the actuation arm is at the second angle the actuation arm positions the actuation column further from the tamper switch than when the actuation arm is at the first angle.

4. The device of claim 1, wherein the actuation arm includes a recessed portion.

5. The device of claim 4, wherein the recessed portion is spaced apart along the actuation arm from the actuation column.

6. The device of claim 5, wherein the recessed portion is adjacent to a location where the actuation arm is supported at the housing.

7. The device of claim 5, wherein the actuation arm has a first surface facing the tamper switch and a second surface opposite the first surface, wherein the recessed portion is at the second surface.

8. The device of claim 1, further comprising:

a controller supported at the housing, wherein the controller is coupled to the tamper switch, wherein when the actuation arm moves from the tamper switch engaged position to the tamper switch released position, the tamper switch sends a tamper signal to the controller.

9. The device of claim 8, wherein the controller is configured to generate a tamper alarm when the controller receives the tamer signal from the tamper switch.

10. The device of claim 1, wherein the actuation arm is configured such that the actuation arm is supported at the housing at each of the tamper switch engaged position and the tamper switch released position.

11. A method comprising the steps of:

mounting a housing at a mounting surface, the housing supporting a tamper switch and an actuation arm, the actuation arm including an actuation column; and when mounting the housing at the mounting surface, changing an angle of the actuation arm relative to the tamper switch to move the actuation arm from a tamper switch released position to a tamper switch engaged position, wherein in the tamper switch engaged position the actuation column contacts the tamper switch and the actuation arm is at a first angle relative to the tamper switch, and wherein in the tamper switch released position the actuation column is spaced apart from the tamper switch and the actuation arm is at a second angle relative to the tamper switch, the second angle being different than the first angle, wherein changing the angle of the actuation arm further comprises changing an angle of the actuation column relative to the tamper switch, wherein in the tamper switch engaged position the actuation arm is at the first angle relative to the tamper switch, and wherein in the tamper switch released position the actuation arm is at the second angle relative to the tamper switch.

12. The method of claim 11, wherein when the actuation arm is at the first angle the actuation arm extends along an arm longitudinal axis that is parallel to the tamper switch.

13. The method of claim 11, wherein when the actuation arm is at the second angle the actuation arm positions the actuation column further from the tamper switch than when the actuation arm is at the first angle.

14. The method of claim 11, wherein the actuation arm includes a recessed portion, and wherein the recessed portion is spaced apart along the actuation arm from the actuation column.

15. The method of claim 14, wherein the recessed portion is adjacent to a location where the actuation arm is supported at the housing.

16. The method of claim 14, wherein the actuation arm has a first surface facing the tamper switch and a second surface opposite the first surface, wherein the recessed portion is at the second surface.

17. The method of claim 14, wherein the angle of the actuation arm is changed by pivoting the actuation arm relative to the housing, and wherein the actuation arm pivots about a point adjacent the recessed portion.

18. The method of claim 11, wherein the actuation arm is supported at the housing at each of the tamper switch engaged position and the tamper switch released position.

* * * * *